(12) United States Patent
Trumbull

(10) Patent No.: US 9,204,132 B2
(45) Date of Patent: Dec. 1, 2015

(54) METHOD AND APPARATUS FOR PHOTOGRAPHING AND PROJECTING MOVING IMAGES IN THREE DIMENSIONS

(75) Inventor: Douglas Trumbull, Southfield, MA (US)

(73) Assignee: Trumbull Ventures LLC, Southfield, MA (US)

( * ) Notice: Subject to any disclaimer, the term of this patent is extended or adjusted under 35 U.S.C. 154(b) by 0 days.

(21) Appl. No.: 13/509,063

(22) PCT Filed: Dec. 23, 2010

(86) PCT No.: PCT/US2010/003251
§ 371 (c)(1),
(2), (4) Date: Jul. 6, 2012

(87) PCT Pub. No.: WO2011/078883
PCT Pub. Date: Jun. 30, 2011

(65) Prior Publication Data
US 2012/0268570 A1     Oct. 25, 2012

Related U.S. Application Data

(60) Provisional application No. 61/290,050, filed on Dec. 24, 2009.

(51) Int. Cl.
*H04N 13/02* (2006.01)

(52) U.S. Cl.
CPC ....... *H04N 13/0296* (2013.01); *H04N 13/0239* (2013.01)

(58) Field of Classification Search
CPC .................................................. H04N 13/0239
USPC .......................................................... 348/57
See application file for complete search history.

(56) References Cited

U.S. PATENT DOCUMENTS

| 4,577,103 | A | * | 3/1986 | Geary et al. | 250/316.1 |
| 5,717,415 | A | * | 2/1998 | Iue et al. | 345/8 |

(Continued)

FOREIGN PATENT DOCUMENTS

WO     2011078883 A1     6/2011

OTHER PUBLICATIONS

McAllister, Display Technology: Stereo & 3D Display Technologies, Department of Computer Science, North Carolina State University published Jan. 15, 2002, 50 pages.
International Preliminary Report on Patentability, received in PCT Application No. PCT/US2010/003251, dated Jun. 26, 2012, 6 pages.
International Search Report, received in PCT Application No. PCT/US2010/003251, dated Apr. 18, 2011, 3 pages.

(Continued)

*Primary Examiner* — Andy Rao
*Assistant Examiner* — Tyler Edwards
(74) *Attorney, Agent, or Firm* — Finch & Maloney PLLC

(57) ABSTRACT

A digital cinematographic and projection process that provides a means of 3D stereoscopic imagery that is not adversely affected by the standard frame rate of 24 frames per second, as is the convention in the motion picture industry worldwide. A method for photographing and projecting moving images in three dimensions includes recording a moving image with a first and a second camera simultaneously and interleaving a plurality of frames recorded by the first camera with a plurality of frames recorded by the second camera. The step of interleaving includes retaining odd numbered frames recorded by the first camera and deleting the even numbered frames, retaining even numbered frames recorded by the second camera and deleting the odd numbered frames, and creating an image sequence by alternating the retained images from the first and second camera.

9 Claims, 2 Drawing Sheets

(56) References Cited

U.S. PATENT DOCUMENTS

| | | | |
|---|---|---|---|
| 6,874,889 B1* | 4/2005 | Hill | 352/208 |
| 2002/0009137 A1* | 1/2002 | Nelson et al. | 375/240.1 |
| 2003/0184674 A1* | 10/2003 | Manico et al. | 348/375 |
| 2007/0146478 A1 | 6/2007 | Butler-Smith et al. | |
| 2007/0279415 A1* | 12/2007 | Sullivan et al. | 345/427 |
| 2009/0160934 A1* | 6/2009 | Hendrickson et al. | 348/47 |
| 2009/0195640 A1 | 8/2009 | Kim et al. | |

OTHER PUBLICATIONS

Trumbull Studios, "The Magi Process", WISTIA video, https://trumbull.wistia.com/medias/wque2mkk41, Jan. 2015.

Luczak et al., "Spatio-Temporal Scalability Using Modified MPEG-2 Predictive Video Coding", X European Signal Processing Conference, Eusipco 2000 CD-ROM Proceedings, vol. II, 16:30, Tampere Finland, Sep. 4-8, 2000, 4 pages.

* cited by examiner

METHOD AND APPARATUS FOR PHOTOGRAPHING AND PROJECTING MOVING IMAGES IN THREE DIMENSIONS

FIELD OF THE INVENTION

The present invention relates to motion picture photography generally and, more particularly, to digital motion picture photography for projecting moving images in three dimensions.

BACKGROUND OF THE INVENTION

Motion picture photography and projection is commonly accomplished via a series of still photographs on a strip of sprocketed celluloid film. In the camera, conventions of the motion picture industry call for a standardized frame rate of 24 frames per second, most commonly photographed using a rotating shutter in the camera such that during 360 degrees of shutter rotation, half of the time ($\frac{1}{48}^{th}$ of a second) the shutter is open while the film is held fixed in the camera aperture, and the other half of the time the shutter is closed in order for a mechanical movement to transport the film to the next frame, utilizing the perforations on the film to register to either sprockets or claws to move the film as well as hold it in position during each exposure.

For projection, the same frame rate of 24 is used, however the shutter speed is doubled, so that each frame of film is shown twice before proceeding to the next frame. The shutter is often called a "butterfly", having two openings of 90 degrees each, and two closures of 90 degrees each, thus still rotating at 360 degrees per frame. During one of the shutter closures the film is advanced to the next frame using a mechanical Geneva mechanism, or sometimes a low inertia electric stepper motor. The reason for the double shuttering, which creates a 48 cycle-per-second rate, is to reduce objectionable perceived flicker of the image on the screen, which is limited in brightness to not more than 16 foot lamberts. Projection brighter than 16 foot lamberts reintroduces objectionable perceived flicker.

An objectionable artifact of this double-shuttering of each image frame is a substantial loss of motion continuity due to the fact that the image does not contain new motion position on each flash, resulting in a stroboscopic effect retained in the human retina. This loss of motion continuity is exacerbated in stereoscopic motion pictures, since frame-to-frame image displacement is often equal to, or more than, the left eye—right eye image separation needed for stereoscopic imagery.

With the advent of digital photography and digital projection, however, it is now possible to consider an alternative methodology of photographing and projecting a series of images in such a manner as to fully retain both temporal motion continuity, while also diminishing the objectionable artifacts of the 24 fps world standard.

It is common knowledge amongst cinematographers, directors, and editors that frame-to-frame object or image motion must be substantially limited in order to avoid objectionable blurring or strobing. Blurring results from object/image motion that occurs during the shutter opening of $\frac{1}{48}^{th}$ of a second. Strobing occurs when the image displacement from one frame to the next becomes so great that the eye cannot integrate the sequence of frames into a smooth motion. Screen size is considered a limitation, since frame-to-frame image displacement can become quite objectionable on large screens due to angular displacement of frames on fast action. IMAX is a good example of this phenomenon, and IMAX films routinely slow their camera and object motion in order to avoid objectionable blurring and strobing.

Another shortcoming of the 24 frame standard is that when projecting a 3D movie, which includes two simultaneous projections of left and right eye imagery, if the motion displacement or blur between frames exceeds the displacement between right and left eye convergence angles, the 3D effect is lost and is overcome by blurring and strobing of the image.

An earlier invention and patent for the Showscan system disclosed the photographing and projecting of motion pictures at sixty frames per second. See U.S. Pat. No. 4,477,160, incorporated herein by reference in its entirety. The Showscan system resulted in a solution for the above shortcomings of conventional film, while demonstrably increasing a sense of "liveness" and audience stimulation. Each frame was shown only once, thus not using a double-bladed shutter, and at a shutter opening of $120^{th}$ of a second, blurring of the recorded image was substantially reduced. At a projection rate of 60 frames per second, there was no apparent flicker at any increased screen brightness, and there was no discontinuity of motion. 3D films photographed and projected in Showscan had no objectionable object/image motion limitations that would adversely affect the 3D illusion.

Nevertheless, worldwide motion picture audiences are accustomed to the 24 frames per second standard, although the advent of 3D production and exhibition is revealing the shortcomings of the 24 fps standard, and since the film is attempting to create a more "immersive" experience for the viewer, it is now possible to consider a high frame rate solution that solves problems in both photography and projection. Accordingly, the present invention is intended to take advantage of emerging digital technologies of electronic cinematography and digital projection, which no longer requires adherence to the world standard of 24 fps. In fact, the entire idea of "frames" as individual still photographs projected in rapid succession can now be revised to a new concept of overall fluid image flow by substantially increasing the number of frames per second. Since the photographed standard 24 fps film must be projected at a higher flash rate in order to avoid perceived flicker, and also solve the requirements for polarized stereoscopic projection, it is common to interleave alternating left and right eye frames via several alternating flashes.

For example, the RealD digital polarization technique alternately polarizes left and right eye images by sequentially flashing each frame as much as three times, resulting in a "flash rate" of 144 flashes (each frame being "shown" onto the screen three times). In this way a 24 fps film can be projected by a single digital projector. Since a new objective of "immersive stereoscopic imagery" is emerging, it is now possible to consider that each of the 144 flashes could actually be new frames of motion information, photographed at 144 frames per second. One of the major shortcomings of the present standards used when projecting 24 fps stereoscopic films is that the temporal information rate is unable to satisfy the need to reduce or eliminate blurring and strobing of the image that is quite objectionable when viewing the film stereoscopically. The advent of this invention is that by alternately photographing 72 left eye images interleaved with 72 right eye images, there remains perfect temporal continuity of the imagery.

In fact, filmmakers often desire to include in their films as much action as possible in order to instill a sense of participation and excitement in viewers, resulting in a sense of sensory immersion. Yet, a tremendous amount of this action is lost in blur if the frame rate is limited to 24 fps. And in 3D, at 24 fps the image may lose all sense of stereoscopic dimension due to both blur and strobing.

In view of the above, there is a need for a digital cinematographic and projection process that provides a means of 3D stereoscopic imagery that is not adversely affected by the standard frame rate of 24 frames per second, as is the convention in the motion picture industry worldwide.

SUMMARY OF THE INVENTION

In view of the foregoing, it is an object of the present invention to provide a method and apparatus for photographing and projecting moving images in three dimensions.

It is another object of the present invention to provide to provide a method and apparatus for photographing and projecting moving images in three dimensions with increased sharpness and clarity.

It is another object of the present invention to provide to provide a method and apparatus for photographing and projecting moving images in three dimensions that results in extremely sharp and unblurred stereoscopic motion.

It is another object of the present invention to provide to provide a method and apparatus for photographing and projecting moving images in three dimensions that removes and corrects objectionable artifacts of blurring, strobing, limited screen brightness, and loss of stereoscopy for 3D.

According to the present invention a method and apparatus for photographing and projecting moving images in three dimensions is provided. The method includes the steps of recording a moving image with a first and a second camera simultaneously and interleaving a plurality of frames recorded by the first camera with a plurality of frames recorded by the second camera. The step of interleaving includes retaining odd numbered frames recorded by the first camera and deleting the even numbered frames, retaining even numbered frames recorded by the second camera and deleting the odd numbered frames, and creating an image sequence by alternating the retained images from the first and second camera.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

As alluded to above, the present invention intends to correct object/image motion and blurring at the digital camera, via means of photographing a sequence of left eye and right eye images at the heretofore unheard of rate of 144 fps, thus delivering to viewers an accurate depiction of the actual motion that occurred at that moment. In digital projection, each frame is shown in its correct temporal sequence, while alternating between left eye and right eye flashes, thus resulting in each eye receiving 72 flashes per second, for a total of 144 fps. Existing digital projection systems already include 120 and 144 cycles-per-second flash rates, thus showing each of the 24 frames five or six times for 2D imagery, or two or three times for interleaved 3D alternating polarization. This eliminates flicker and makes possible substantially increased screen brightness, since the limiting factor of 16 foot lamberts at 48 flashes per second has been substantially exceeded.

In the short-term implementation of this invention, photography will occur at a predetermined "frame rate" that is considered more than adequate to capture clear and unblurred stereoscopic image information, preferably at around 120 or 144 frames per second. Alternatively, however, this could possibly be any new number of frames per second necessary to meet industry demands regarding data storage, compression, and distribution costs vs. image quality/impact issues.

An example of the above process would be to shoot at 144 frames per second with a shutter opening of 360 degrees, which is possible with certain digital cameras. In this way, each frame would have an exposure of almost exactly $1/144^{th}$ of a second, resulting in minimal blur on each frame as compared to shooting at 24 fps, with a shutter opening of $1/48^{th}$ of a second. By digitally alternating left and right eye frames in correct temporal succession, the resultant imagery would create a strong "immersive experience".

Figure 1:
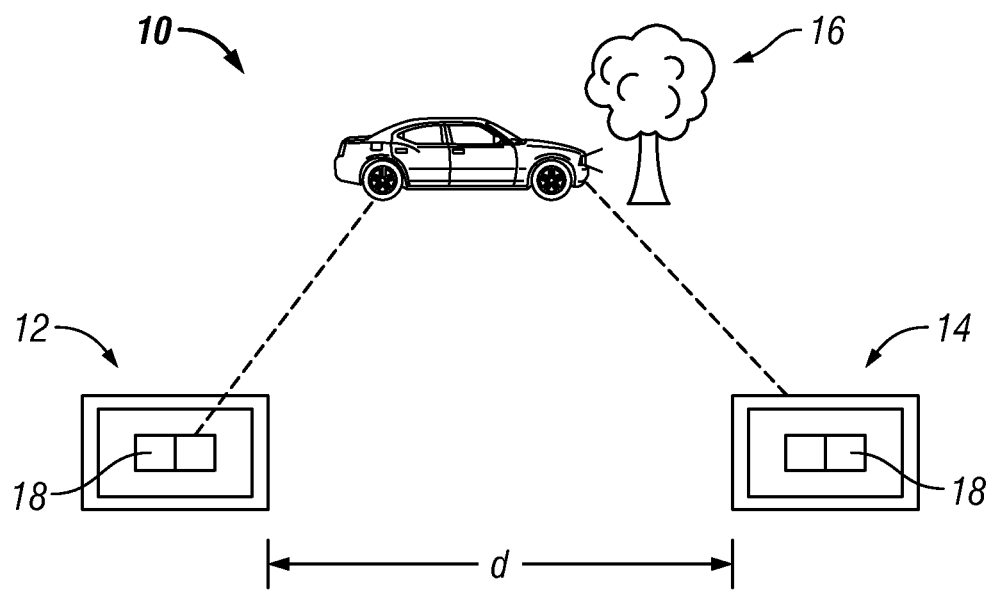
FIG. 1 illustrates an apparatus for photographing and projecting moving images in three dimensions according to one embodiment of the present invention.
Figure 2:
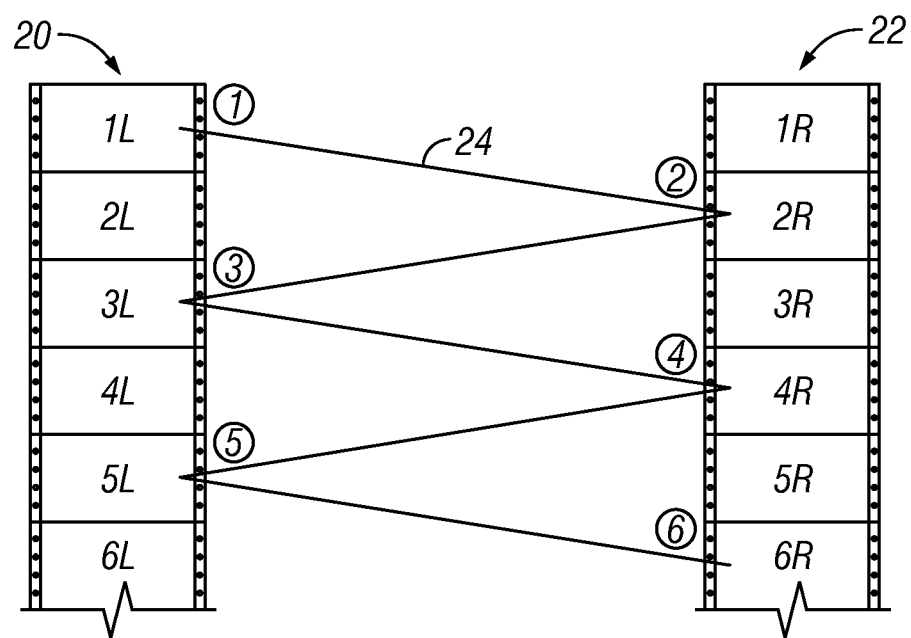
FIG. 2 illustrates frames of images recorded on a pair of sprocketed film reels using the apparatus of FIG. 1.

Referring to FIG. 1, a first embodiment of the present is shown. As illustrated therein, a first iteration of the process would be to configure dual digital cameras, a first camera 12 and a second camera 14, side-by-side, with a lens center separation, d, similar to standard interocular spacing of approximately 2.25". Each camera would record synchronized imagery 16 at 144 frames per second, using a 360 degree shutter 18. This recorded synchronized imagery is shown in FIG. 2 wherein imagery from the first camera 12 is recorded on a first strip of film 20 and imagery from the second camera 14 is recorded on a second strip of film 22. Thus, by alternately interleaving frames 1,3,5,7,9 from the first camera 12 (deleting the even frames) with frames 2,4,6,8 etc. (deleting the odd frames) from the second camera 14, a single data stream would therefore contain alternating stereo pairs of images that would be projected in correct temporal sequence, resulting in extremely fluid, non-blurred, and higher impact stereoscopic imagery that could then be projected via an alternating polarization system such as RealD's single projector electronically controlled polarization. The image sequence of interleaved frames, i.e., the data stream, is represented by the zigzag sequence line 24 in FIG. 2.

Figure 3:
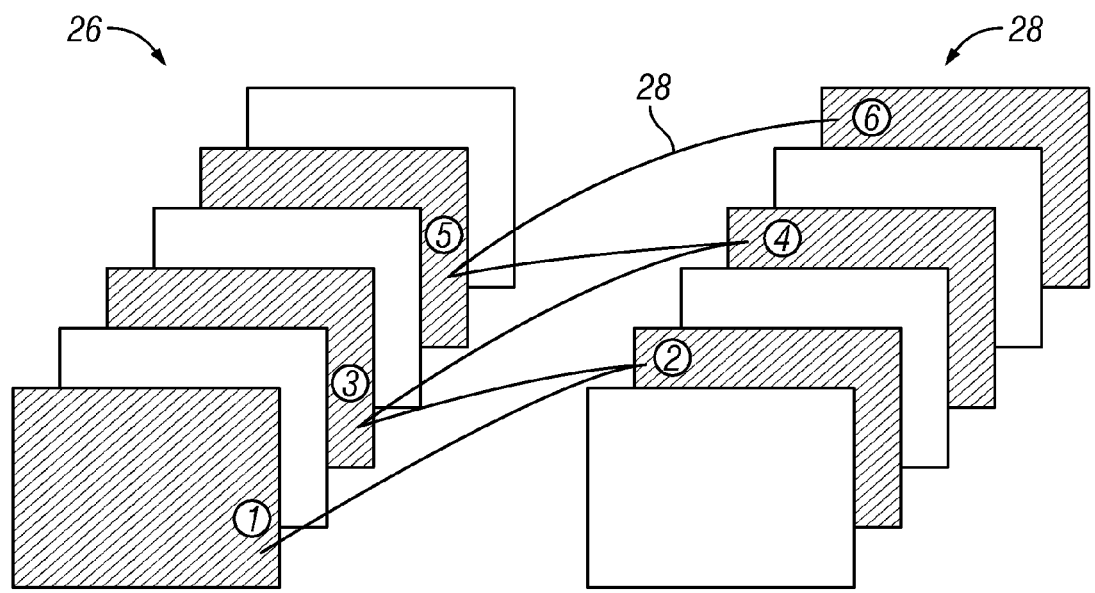
FIG. 3 illustrates frames of images recorded digitally using the apparatus of FIG. 1.

Referring to FIG. 3, frames of images recorded digitally using the apparatus 10 of FIG. 1 are shown wherein the first set of frames 26 contain imagery recorded by the first camera 12 and the second set of frames 28 contain imagery recorded by the second camera 14. As discussed above, by alternately interleaving frames 1,3,5,7,9 from the first camera 12 (deleting the even frames) with frames 2,4,6,8 etc. (deleting the odd frames) from the second camera 14, a single data stream would therefore contain alternating stereo pairs of images that would be projected in correct temporal sequence, resulting in extremely fluid, non-blurred, and higher impact stereoscopic imagery. The image sequence of interleaved frames, i.e., the data stream, is represented by the zigzag sequence line 30 in FIG. 2.

Figure 4:
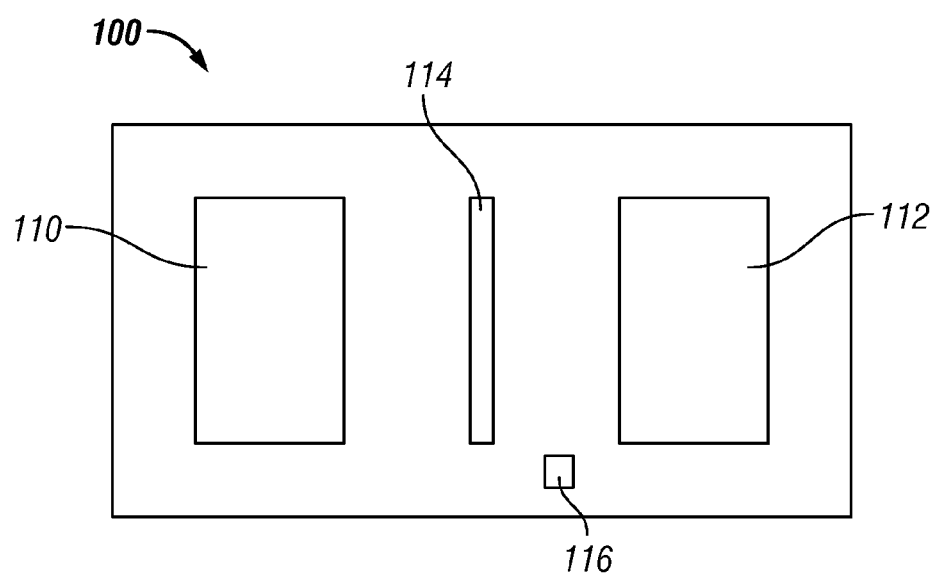
FIG. 4 illustrates an apparatus for photographing and projecting moving images in three dimensions in accordance with another embodiment of the present invention.

Referring now to FIG. 4, an apparatus 100 according to a second embodiment of the present invention is shown. As shown therein, a second embodiment of the present invention includes the fabrication of a single digital camera technology that includes within it the appropriate left and right eye lenses 110, 112 and an alternating rotating mirror shutter 114 that would sequentially deliver left and right eye images to a single sensor 116 at 144 fps. Thus, the left and right eyes each receive interleaved stereoscopic streams of 72 fps each.

The most common digital projection systems today are using either the Texas Instruments Digital Light Processing chips (DLP) that use a matrix of micro mirrors to deliver imagery, or the Sony SXRD liquid crystal on silicon (LCOS) technology. It is well known that these chips can "switch" states of the micro mirrors at up to 144 Hz. They use a frame buffer that retains 24 frame material, so each frame may be flashed six times for 2D, or in the event of 3D, alternates between left and right imagery, showing each frame for three alternating flashes. This invention anticipates the introduction of a new contiguous data stream, without a frame buffer, that can introduce new motion imagery on virtually every flash, thus resulting in extremely sharp and unblurred stereoscopic motion.

An additional anticipated aspect of this new technology involves issues related to potentially reduced signal to noise ratio, lowered bit depth, or other problems resulting from such brief exposures on a CCD or CMOS imager. However, "trading off" these issues with increased apparent sharpness and clarity (rather than blur) could more than make up for this. It is also possible to "trade off" resolution in exchange for motion continuity and clarity, for example reducing resolution from, say, 4K to 2K, while delivering less blurred stereoscopic imagery. The human eye may still prefer, and not notice, such a process since the overall experience is one of tremendously increased image information.

The expected result of the invention will be the advent of a digital motion picture standard that contains within it the desires of both filmmakers and cinema viewers to deliver the "immersive experience" that they expect of a 3D movie, but with all of the objectionable artifacts of blurring, strobing, limited screen brightness, and loss of stereoscopy for 3D removed and corrected. The invention will facilitate the production of films with unlimited action potential, as well as unlimited screen size and brightness. The invention anticipates the inclusion of motion/action that may exceed the 60 frames per second rate of Showscan, with fast action updated on every flash, rather than the objectionable double shuttering of film. Overall, this invention will result in an increased sense of audience excitement and stimulation, which is expected to be measurable via electromyogram, electroencephalogram, galvanic skin response, electrocardiogram, and possibly even Functional Magnetic Resonance Imaging.

Since 3D films must also be available to the marketplace in normal 2D as well as 24 fps standard for showing in normal cinemas and on television, it is an implicit intention of this invention to offer that (from either left or right eye image streams) groups of frames can be digitally merged into a single frame that would be indistinguishable from the same subject photographed at 24 fps, since the shutter was open 360 degrees. This is accomplished, in the case of 144 fps by combining three sequential frames into one, then deleting the next three sequential frames, thus resulting in 24 frames that would be identical to having been originally photographed with a 180 degree shutter. In the case of 120 fps, three sequential frames would be combined, and the following two sequential frames would be deleted, thus also resulting in 24 fps. If a filmmaker chose to use the iteration of this invention that uses a single digital camera equipped with an alternating mirror shutter there could be objectionably uneven merging of frames, since there would no longer be the equivalent of a 360 degree shutter, but rather a 180 degree shutter. Nevertheless, it would be possible to use the 120 frame version of the invention, using only the (single eye) sequence of combining frames 1 and 3, while deleting frame 5, thus resulting again in 24 fps.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A method for projecting moving images in three dimensions, comprising:
    receiving left eye frames of a moving image as recorded with a first camera lens having a first lens center and having been recorded at at least 60 frames per second and at left eye recordal times;
    receiving right eye frames of said moving image recorded with a second camera lens having a second lens center that is spaced apart from the first lens center and having been recorded at at least 60 frames per second and at right eye recordal times offset from the left eye recordal times; and
    projecting said moving image onto a cinema screen from a single projector in three dimensions by flashing frames one time each in a sequence that alternates between left eye frames as recorded at the left eye recordal time by said first camera lens and right eye frames as recorded at the right eye recordal times by said second camera lens, each successive frame of the sequence having been recorded at a successive time and projected temporally with respect to one another in the sequence to show the moving image, resulting in a projected frame rate of at least 120 frames per second.

2. The method for projecting moving images of claim 1, further comprising:
    projecting said moving image with an alternating polarization system.

3. The method for projecting moving images of claim 2, wherein:
    said alternating polarization system is a single projector electronically controlled polarization system.

4. The method for projecting moving images of claim 1, wherein:
    said first and said second camera lenses have a lens separation of approximately 2.25 inches.

5. The method for projecting moving images of claim 1, wherein:
    projecting occurs at a frame rate of 120 or more frames per second.

6. The method for projecting moving images of claim 1, wherein:
    projecting occurs at a frame rate of 144 or more frames per second.

7. The method for projecting moving images of claim 1, wherein each successive frame of the sequence represents new motion of imagery.

8. The method for projecting moving images of claim 1, wherein projecting said moving image includes digital projection of digital frames.

9. The method of claim 1, where projecting said moving image includes projecting said moving image onto a cinema screen from a single projector in three dimensions by flashing frames one time each in a sequence that alternates between left eye frames consisting of imagery recorded at the corresponding left eye recordal times by said first camera lens and right eye frames consisting of imagery recorded at the corresponding right eye recordal times by said second camera lens.

* * * * *